United States Patent
Brooks

[15] 3,665,442
[45] May 23, 1972

[54] NON-VOLTAGE SENSITIVE INDICATOR LIGHT

[72] Inventor: William Thomas Brooks, 4300 Washington, Midland, Mich. 48640

[22] Filed: June 2, 1969

[21] Appl. No.: 829,339

[52] U.S. Cl.......................340/248 R, 250/217 SS, 307/304, 307/311, 340/253 R
[51] Int. Cl........................................................G08b 21/00
[58] Field of Search....................340/248, 176, 166 FE, 253; 250/217 SI, 217 SS, 211 J, 199; 307/304, 311; 315/169; 313/108 D; 324/96; 328/2

[56] References Cited

UNITED STATES PATENTS 3,245,002  4/1966  Hall..............................250/217 SI UX
3,443,151  5/1969  Myers et al........................307/304 X

OTHER PUBLICATIONS

Electronics World, " Using the New Constant–Current Diodes," by Donald E. Lancaster, pp. 30, 31, 78; October 1967

Primary Examiner—John W. Caldwell
Assistant Examiner—Daniel Myer
Attorney—Edgar J. Brower, Arthur L. Branning and Thomas O. Watson, Jr.

[57] ABSTRACT

An indicator light unit comprising a field effect current regulator diode in series with a gallium arsenide phosphide diode (solid state light). This configuration when connected across a pair of terminals such as the firing circuit of an airborne rocket, will enable the detection of stray voltages on the terminals considerably below the normal firing voltage without damage to the light when the operating voltage is impressed.

3 Claims, 5 Drawing Figures

PATENTED MAY 23 1972  3,665,442

INVENTOR
WILLIAM T. BROOKS

BY Thomas O. Watson Jr.

ATTORNEY

NON-VOLTAGE SENSITIVE INDICATOR LIGHT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to indicator lights, and more particularly to non-voltage sensitive indicator lights, i.e. indicator lights operable over a wide voltage range without damage to or destruction of the lights.

Military aircraft are frequently armed with solid propellant rockets which are electrically fired by means of a bridge wire embedded in the propellant. Since the usual bridge wire will ignite the rocket propellant upon dissipation of one watt therein, an impedence device, such as an ovonic threshold switch, is generally connected in series with the bridge wire to preclude firing of the rocket due to small stray voltages appearing on the firing circuit terminals. The usual aircraft power supply is a 28 volt, 400Hz system and the ovonic switch threshold is nominally 20 volts. Presently used firing squibs do function satisfactorily with this arrangement.

However, occasional accidental firings indicated a need for modification of presently used firing circuits. Investigation revealed that the operation of powerful radar sets in the vicinity of the aircraft would sometimes result in large induced voltages appearing in the aircraft electrical system, including the rocket firing circuits. It was concluded that it would be highly desirable to provide a warning device which would indicate the presence of a voltage on the firing circuit terminals and alert the ordnanceman that the rocket pigtail must not be plugged in. Ideally, this warning device should be capable of coping with a large voltage range extending from well below the 20 volt threshold of the ovionic switch to a value considerably above this without damage to the indicator.

One obvious type of indicator which immediately suggests itself is a warning light of some sort. Incandescent lights, in the absence of complicating protective circuitry, are not suitable because of their sharply limited voltage range. Neon flash lamps, while providing a large voltage range, are unsatisfactory because their minimum operating voltage is about 60 volts; far in excess of the normal firing voltage of 28 volts.

SUMMARY OF THE INVENTION

The general purpose of this invention is to provide an indicator light that has all the advantages of similarly employed indicator lamps and yet has none of the above-described disadvantages. To attain this end, the present invention provides a light emitting diode and a field effect diode in series with the light emitting diode to limit the current therethrough whereby a large voltage range and low minimum operating voltage are obtained.

OBJECTS OF THE INVENTION

It is a primary object of this invention to provide a new and improved indicator light.

It is another object of this invention to provide an indicator light responsive to a wide range of voltages.

It is a further object of this invention to provide an indicator light which has a low threshold voltage and is responsive to a large voltage range.

BRIEF DESCRIPTION OF THE DRAWINGS

Other objects, advantages and novel features of the invention will become readily apparent upon consideration of the following detailed description when read in conjunction with the accompanying drawings wherein.

DESCRIPTION OF THE PREFERRED EMBODIMENTS

Figure 1A:
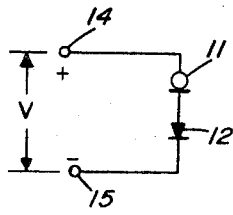
FIGS. 1a, 1b and 1c are schematic diagrams of various arrangements of the present invention.

Attention now is directed to the drawings, and more particularly to FIG. 1a wherein is shown the basic arrangement of the elements of the indicator light of the present invention comprising a current limiting device such as a field effect current regulator diode 11 connected in series with a light emitting diode 12. The diode 12 may be a gallium arsenide phosphide diode or other light emitting diode. The diodes 11 and 12 are connected across a pair of terminals 14 and 15, such as the firing circuit of an aircraft rocket, for the purpose of indicating a voltage V whenever it appears on the terminals 14 and 15.

Figure 1B:
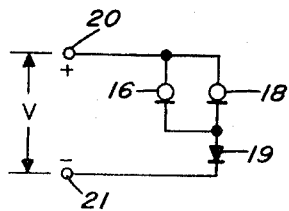

FIG. 1b illustrates an arrangement which may be utilized to increase the brightness of the light emitting diode (e.g. for daylight use) where the nominal current passed by the field effect diode is insufficient to insure maximum brightness. Here, two field effect diodes 16 and 18 are connected in parallel with each other and in series with a light emitting diode 19. This combination is connected across terminals 20 and 21 to indicate a voltage V whenever it appears.

Figure 1C:
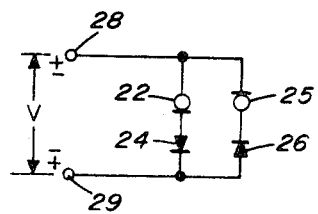

FIG. 1c illustrates an arrangement which may be utilized in instances where the polarity of the voltage V is uncertain. A field effect diode 22 and light emitting diode 24 in series are connected in parallel and opposed relationship with a series combination of a field effect diode 25 and light emitting diode 26. This network is then connected across terminals 28 and 29 where the voltage V may appear. When a voltage is impressed on terminals 28 and 29, then either diode 24 or diode 26 will light depending upon the polarity of the voltage V.

OPERATION

Figure 2:
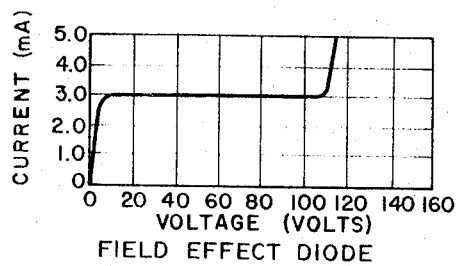
FIG. 2 is a typical current-voltage curve of a field effect diode.
Figure 3:
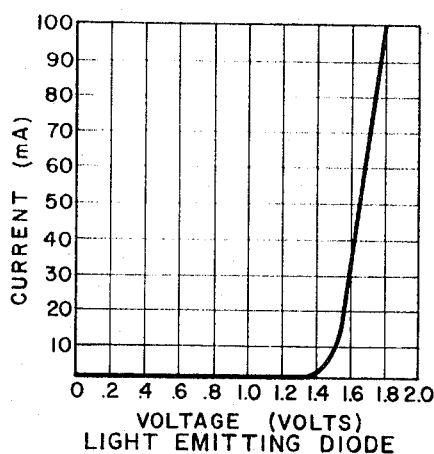
FIG. 3 is a typical current-voltage curve of a light emitting diode.

In order that a better understanding of the invention might be had, its mode of operation will now be described. FIG. 2 represents the current-voltage curve of a typical field effect current regulator diode. It can be seen that the current through the diode reaches its nominal value when only a few volts are applied to the diode and then remains substantially constant over a range of about 100 volts. FIG. 3 represents the current-voltage curve of a typical light emitting diode. As can be seen from this diagram, the diode requires about 1½ volts to light up and then the current flow increases very rapidly as the voltage rises.

The current regulating effect of the field effect diode or diodes in FIGS. 1a–c protects the light emitting diode from overload. That is, the current passed by the field effect diodes determines the voltage drop across the light emitting diodes. Thus, as the voltage on the test terminals increases, the drop across the field effect diodes increases and that across the light emitting diodes remains constant so long as the applied voltage remains within the total voltage range of the field effect diodes.

In conclusion, it is believed that it has been made clear that the present invention possesses numerous advantages not found in prior art devices. For example, the indicator light of the present invention is insensitive to voltages in the sense that a uniform light effect is obtainable over a wide range of voltages. Also, it is responsive to voltages on the order of 2½ to 100 volts, or even more or less depending upon the components used. Thus it is ideally suited for utilization as aforedescribed when it is desired to operate a circuit at 28 volts and also detect voltages in this circuit which vary considerably from this nominal value, in both directions, without damage to the light.

It is to be understood that the above-described devices are simply illustrative of preferred embodiments which utilize the principles of the present invention. Numerous other arrangements may be readily devised, by those skilled in the art, which still embody the principal features of this invention and fall within the spirit and scope thereof.

What is claimed is:

1. An indicator light operable over a wide range of voltages comprising:
   a light emitting diode;
   a current limiting device comprised of at least one field effect current regulating diode connected in series with said light emitting diode; said current limiting device providing substantially constant illumination from said light emitting diode over a range of approximately 2 1/2 volts to 100 volts;
   wherein said current limiting device is a plurality of field effect current regulator diodes connected in parallel.

2. An indicator light operable over a wide range of voltages comprising:
   a light emitting diode;
   a current limiting device comprised of at least one field effect current regulating diode connected in series with said light emitting diode; said current limiting device providing substantially constant illumination from said light emitting diode over a range of approximately 2 ½ volts to 100 volts;
   a second light emitting diode emitting diode connected in the opposite polarity of said first light emitting diode; and
   a second current limiting device connected in series with said second light emitting diode;
   said second diode being connected in parallel with the first mentioned diodes whereby the combination is responsive to voltages of either polarity on either terminal.

3. An indicator light as defined in claim 1 wherein said light emitting diode is a gallium arsenide phosphide diode.

* * * * *